Figure 1:
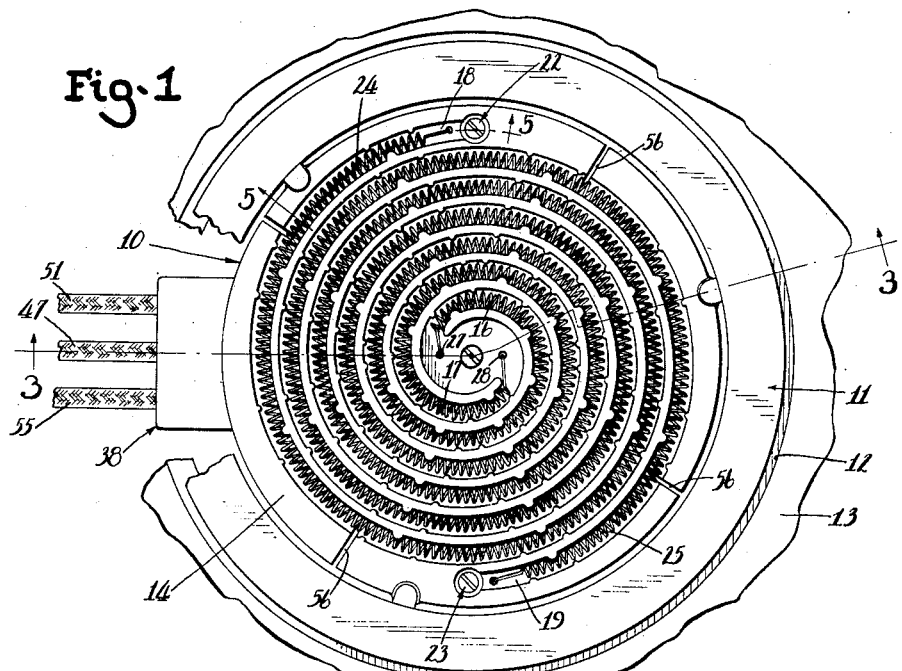

Edwin L. Wiegand and Ernest N. Calhoun
INVENTORS

Jan. 31, 1939.  E. L. WIEGAND, ET AL  2,145,564
HEATING MEANS
Filed Nov. 12, 1935  2 Sheets-Sheet 2
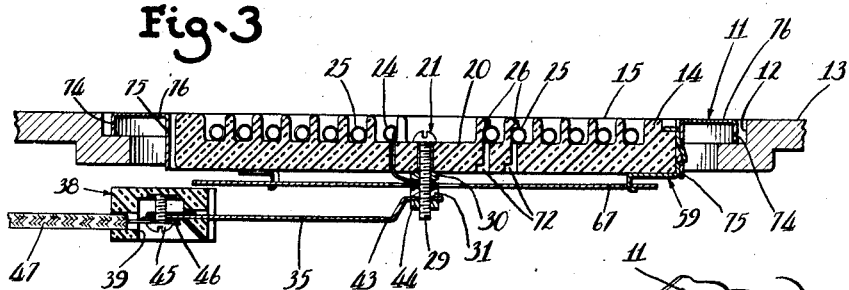
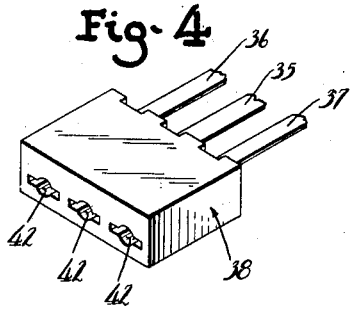
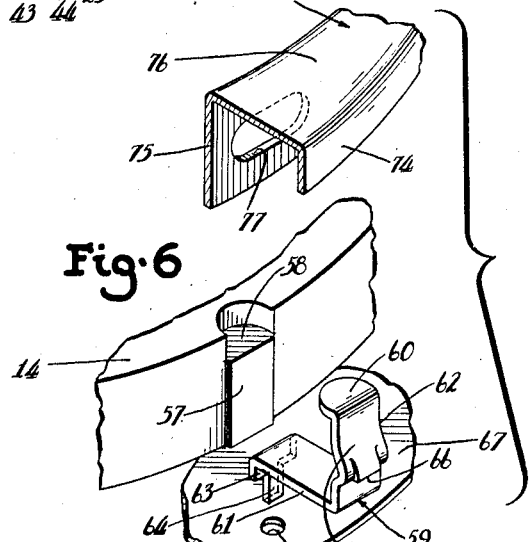
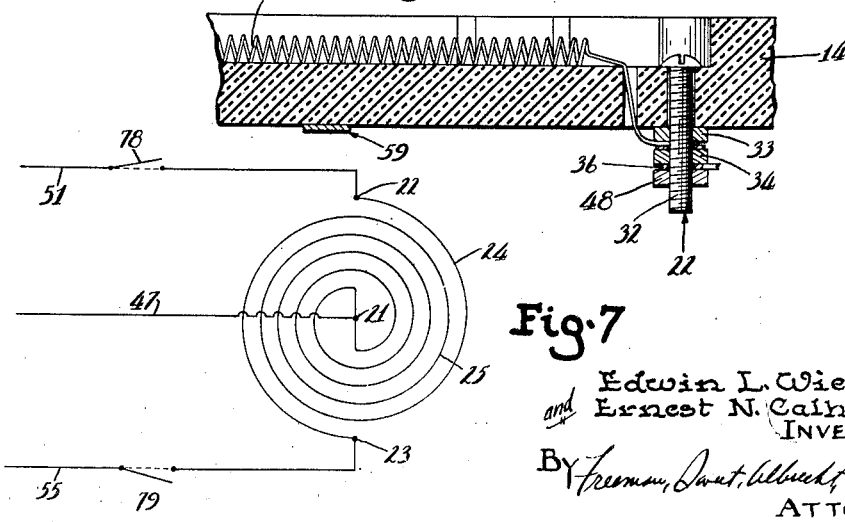
Edwin L. Wiegand
and Ernest N. Calhoun
INVENTORS
ATTORNEYS Patented Jan. 31, 1939

2,145,564

UNITED STATES PATENT OFFICE

2,145,564

HEATING MEANS

Edwin L. Wiegand and Ernest N. Calhoun, Pittsburgh, Pa., assignors, by mesne assignments, to Edwin L. Wiegand, Pittsburgh, Pa.

Application November 12, 1935, Serial No. 49,368

7 Claims. (Cl. 219—37)

Our invention relates to heating means, and more particularly to the electrical resistance type of heating units, and the principal object of our invention is to provide a new and improved heating means of this type.

Figure 2:
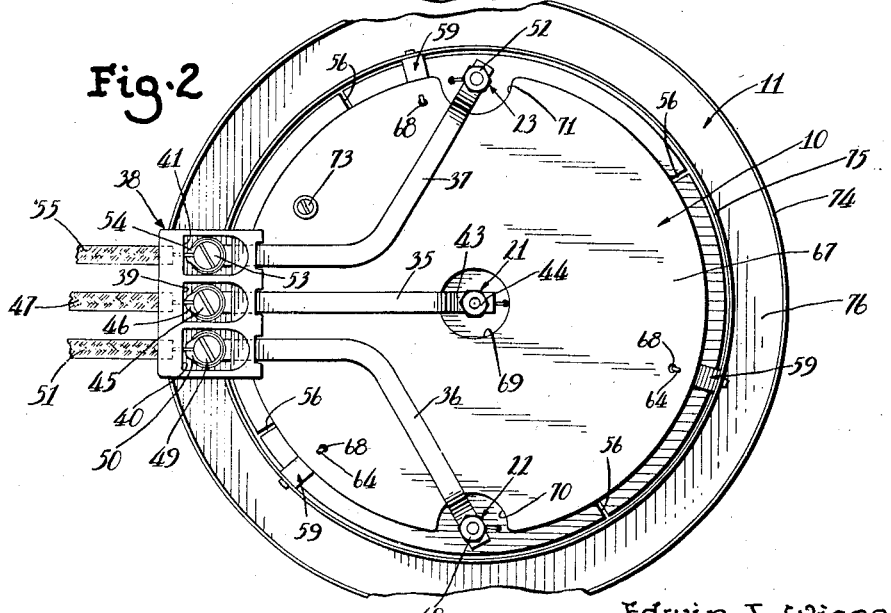

In the drawings accompanying this specification, and forming a part of this application, we have shown, for purposes of illustration, one form which our invention may assume, and in these drawings:

Figure 1 is a top plan view of the embodiment of our invention, illustrating adjoining parts of cooperating members fragmentarily, Figure 2 is a bottom plan view of the embodiment shown in Figure 1, some parts having been omitted and some broken away to better fit the view to the sheet, Figure 3 is a sectional view corresponding to the broken line 3—3 of Figure 1, Figure 4 is a perspective view of a detail, Figure 5 is an enlarged fragmentary sectional view corresponding to the line 5—5 of Figure 1, Figure 6 is an enlarged disassembled fragmentary perspective view showing a connection means, and Figure 7 is a diagrammatic view illustrating a manner of electrical connection.

The embodiment of our invention herein disclosed comprises a heating source, here shown to be an electric heating element 10, adapted to cooperate with adapter means 11, the latter means adapting the heating unit 10 for placement within a recess 12, such as an aperture formed in a stove surface 13, in a manner as suggested in Figure 3.

The heating unit 10 comprises a support 14, and as here shown, the support may be a disc-shaped piece of electric and heat insulating material of substantial thickness; one material which is preferably used is porcelain.

As best shown in Figure 3, one flat surface 15 of the support 14 is provided with a series of grooves extending into the thickness of the support a considerable distance. The grooves are preferably spiral-shaped, starting from the center of the support 14 and working toward the periphery thereof. As disclosed in Figure 1, two spiral grooves 16 and 17 are formed in the surface 15 of the support 14, the spiral grooves 16 and 17 starting adjacent the center of the support 14, with the inner portions thereof substantially diametrically opposed, and working outwardly, in an intercalated manner, the extremities thereof also being preferably diametrically opposed, as shown at 18 and 19.

The central portion of the support 14 may be recessed, as shown at 20, to a level corresponding to the recessed surface of the grooves 16 and 17, and at this central portion a terminal receiving means 21 may be positioned. Terminal receiving means 22 and 23 are also preferably disposed respectively adjacent the ends 18, 19, of the grooves 16, 17, the terminals 22, 23 being similar in construction to the center terminal 21.

Disposed within the grooves 16, 17 are heating means, preferably comprising helical coils 24 and 25, of any well known electrical resistance wire. It will be appreciated, however, that the heating means may take the form of any other well known heat producing source. Also, and with particular reference to the electric-resistance type of heating element, the helical coils 24, 25 may be replaced by a strip of resistance material, bent zig-zag or any other shape, or possibly a plain resistance wire or strip, and this resistance material disposed in the grooves to assume the configuration thereof.

As best shown in Figure 1, the helical coil 24 is disposed within the channel formed by the groove 16, and necessarily assumes the spiral shape of the groove. The helical coil 25 is in like manner disposed within the groove 17. As shown in Figures 1 and 3, the helical coils 24, 25 are of a lesser diameter than the width of the respective grooves 16, 17, to facilitate the assembly of the coils with the grooves, and also to permit differential expansion between the coils and the support 14. To hold the coils 24, 25 in operative position, the grooves 16 and 17 are provided with a plurality of abutments 26, adjacent the outermost part of the walls thereof, the abutments 26 overhanging the coils 24, 25, and tending to hold these coils in position in their respective grooves.

The inner extremities of the coils 24, 25 are respectively passed through apertures 27 and 28, formed in the recessed central portion 20 of the support 14, and the extremities extend through to the opposite surface of the support, and are secured to the center terminal-receiving means 21. As best shown in Figure 3, the center terminal 21 preferably comprises a machine screw 29, having its head engaging the adjacent surface of the recessed portion 20, and its screw-threaded shank passing through a central aperture in the support 14, and projecting away from the opposite surface of the support. A nut 30 engages the screw-threaded shank of the screw 29 and draws this screw up tightly in position with respect to the support 14. The extremity of the coils 24, 25 are then wound around the screw 29 and a washer is interposed between the winding of each extremity. A nut 31 is then screwed onto the shank of the screw 29 to mechanically and electrically hold the inner extremities of the coils 24, 25 assembled with the center terminal 21.

The outer extremities of the coils 24, 25 are fastened to the respective terminals 22, 23 in a similar manner, only the terminal 22 being shown in detail, and a description of this connection will suffice. The terminal 22 comprises a machine screw 32, having its head disposed adjacent the portion 18 of the groove 16, the head thereof bearing against the bottom of the groove and the screw-threaded shank passing through an aperture in the support 14 and extending away from the opposite surface of the support. A nut 33 engages the screw-threaded shank and the adjacent surface of the support to firmly hold the screw 32 in position. The outer extremity of the coil 24 is then wound around the shank, and a washer and a nut 34 are positioned on the shank to hold the extremity of the coil mechanically and electrically to the terminal 22.

Conducting strips 35, 36, and 37, each having one end respectively engaging the terminals 21, 22, and 23 are provided to connect these terminals to a suitable source of energy. The other end of the conducting strips lead to a point within a connection block 38, the latter preferably being formed of the same material as the support 14, and the block is floatingly held in position by its connection with the conductor strips. As here shown, the block 38 is provided with recesses 39, 40, 41 in a longitudinal face thereof, and apertures are provided in a longitudinal end thereof to provide for the entrance of the adjacent extremities of the conducting strips to within the respective recesses. Recesses 42, as best shown in Figure 4, are provided in the opposite longitudinal end to permit energy source conductors to enter the recesses 39, 40, 41 formed in the block 38.

The conducting strip 35 has an angular extremity 43 provided with an aperture to pass the shank of the terminal 21, a nut 44 being positioned on the screw-threaded shank to hold the conducting strip in operative position. The other extremity of the conducting strip 35 has its end doubled over upon itself, and the doubled over end passes through the aperture formed in one longitudinal end of the block 38 and is disposed in the recess 39. The doubled over end may be provided with a screw-threaded recess to provide for interengagement with a screw 45. A dish-shaped washer 46 is interposed between the head of the screw 45 and the doubled over end of the conducting strip 35, and provides means for engaging the bared extremity of an energy conductor 47.

As shown in Figure 2, the terminals 21, 22, and 23 are diametrically in line, the conducting strip 35 extending rectilinearly to the connection block 38. The conducting strip 36 is angular in longitudinal extent, and has a downwardly bent apertured extremity held to the terminal 22 by a nut 48. The other extremity has a doubled over end extending through the aperture formed in the longitudinal end of the block 38 and is disposed in the recess 40. The doubled over end is provided with a screw-threaded aperture for the accommodation of a screw 49, a dish-shaped washer 50, similar to the washer 46, being provided for the reception of the bared end of an energy conductor 51. The conducting strip 37 is similar in configuration to the conducting strip 36, but is oppositely disposed, one extremity being apertured and secured to the terminal 23 by a nut 52, and the other extremity having its end doubled over and passing through the aperture in one longitudinal end of the block 38 and disposed within the recess 41 formed in the block 38. The extremity within the block 38 is provided with a screw-threaded aperture to receive the shank of a screw 53. A dish-shaped washer 54 is interposed between the head of the screw 53 and the doubled-over end of the conducting strip 37, to provide means for the reception of the bared end of an energy conductor 55.

The support 14 may be provided with slots 56, formed at spaced points along its periphery, to prevent distortion which may result from differential expansion.

Referring particularly to Figure 6, the peripheral edge of the support 14 is here shown as provided with spaced-apart flattened integral lug portions 57, and the upper surface of the support 14, adjacent each lug portion 57, is provided with a recess 58 having a flat bottom wall angularly disposed with respect to the lug portion 57. Cooperating with each lug portion 57, here shown to be three in number, are connection means 59, preferably in the form of a U-shaped clamp, having a short leg 60, a relatively long leg 61, and a bight 62. Each U-shaped clamp 59 is positioned to engage a respective lug portion 57, with the inwardly directed surfaces of the legs 60, 61 respectively frictionally engaging the flat bottom wall of the recess 58 and the flat bottom surface of the support 14, and the bight 62 of the clamp 59 abutting the flattened surface of the lug portion 57. The end of the leg 61 is provided with an angularly downturned projection 63, having its extremity reduced in width to provide a tongue 64. The bight 62 is provided with an inclined portion 65, intermediate the legs 60, 61, the inclined portion 65, adjacent the leg 61, having a part struck-out intermediate its width to form a shoulder 66.

With the clamps 59 in place on the support, reflecting means 67, having apertures 68 formed therein, are positioned so that the apertures 68 correspond with the tongues 64 of the clamps 59. The tongues 64 of the clamps 59 are formed to pass through the apertures 68 so that the shoulder, formed between the reduced tongue and the downturned projection 63, will abut the adjacent surface of the reflecting means to space the reflecting means 67 from the heating element 10, and the portion of the tongues 64 extending through and away from the reflecting means is bent over the adjacent surface to hold the reflecting means in position. The reflecting means 67 may be metallic, preferably of heat-resisting material such as chromium, and is provided with a central aperture 69 to pass the center terminal 21, and peripheral notches 70 and 71 to pass the terminals 22, 23. It will be appreciated that the connection of the strip conductors 35, 36, 37, to their respective terminals, cannot be effected until the reflecting means 67 has been properly assembled with the support 14. To provide passage for the heat transmitted by the reflecting means, the support 14 may be provided with axially extending apertures throughout its area, two of such apertures 72 being shown in Figure 3. The reflecting means may also be provided with a conductor receiving means, such as a screw 73, threaded into a screw-threaded aperture in the reflecting means, to provide for a connection to a suitable ground, to obviate danger resulting from short circuits.

The adapter ring 11 is preferably formed as disclosed in Figures 3 and 6, wherein the ring 11 is shown to be of annular U-shaped construction, with the outer annular flange 74 being shorter in axial extent than the inner annular flange 75, so that when the flange 74 has its terminating surface abutting a surface of the recess 12 in the stove 13, the bight portion 76 of the adapter ring 11 and the top of the support 14 will lie substantially in a plane including the top of the stove 13. The flange 75 of the adapter ring 11 is provided with apertures 77, spaced apart to align with the connection clamps 59. To assemble the adapter ring 11 with the support 14, the ring 11 is disposed about the periphery of the support 14, with the inner surface of the flange 75 circumscribing the adjacent surface of the bight portions 62 of the clamps 59. Pressure upon the ring 11 will cause the inclined surface 65 of the bight portions 62 to cam the flange 75 radially outwardly, and further pressure will move the ring relatively and axially with respect to the support 14 until the margins of the apertures 77 in the flange 75 clear the shoulders 66 formed on the clamps 59, whereupon the surfaces adjacent the apertures 77 will snap into engagement with the shoulders 66 and the inclined surfaces 65 and lock the adapter ring 11 in position.

Figure 7 discloses a diagrammatic electrical hook-up for the coils 24, 25. As here shown, the conductor 47 leads to the center terminal 21, and the conductors 51, 55 lead to the terminals 22, 23 respectively. If desired, current control means 78 and 79 may be respectively interposed in the conductors 51, 55 to selectively control the energization of the coils 24, 25. Therefore, it will be apparent that a "low" heat and a "high" heat may be established by the electric unit 10 by suitably manipulating the control means 78, 79. Furthermore, either a "low" or "high" heat may be maintained without the need of localizing the heat, it being appreciated that each of the coils 24, 25 traverses a considerable portion of the area defined by the periphery of the support 14.

It will of course be obvious that further changes in the heating qualities of the coils 24, 25 may be effected, as for instance, by using coils of different resistances, or by placing an additional current impeding device (not shown) in circuit with either one of the conductors 51, 55 to supply current of different quantities to the coils 24, 25. Also, it is possible to directly supply the conductors 51, 55 with current of different values, in which case it is preferable to provide two center terminals, each connected to a respective inner extremity of a coil, and returning to its respective circuit.

It will further be obvious that the coils 24, 25 may be formed of a single element of electric resistance and heating qualities, as for instance an element starting from the terminal 22, connected to the terminal 21, and terminating at the terminal 23.

From the foregoing it will be apparent to those skilled in the art that the illustrated embodiment of our invention provides a new and improved heating means and accordingly, accomplishes at least the principal object of our invention. It further will be obvious to those skilled in the art that the illustrated embodiment of our invention may be variously changed and modified without departing from the spirit of our invention, or sacrificing all of the advantages thereof, and that accordingly, the disclosure herein is illustrative only, and our invention is not limited thereto.

We claim:

1. A heating device, comprising: a body, carrying heating means, and having spaced surfaces, one of said surfaces being adapted to support means to be heated, and having spaced-apart recesses at the peripheral part of said body; a heat directing member, overlying the other of said surfaces; and means supporting said member in position overlying said other surface, comprising a plurality of clamps secured to said body at spaced points, and each having a jaw engaging the bottom of a respective one of said surface recesses, and another jaw engaging said other surface, said jaws being connected by a part overlying the periphery of said body, and each of said clamps having also a portion connected to said member.

2. A heating device, comprising: a body, formed of refractory material, and having spaced surfaces, said body carrying heating means; a heat directing member, overlying one of said surfaces, and having a plurality of recesses; and means supporting said member in position overlying said surface, comprising a plurality of metallic U-shaped clamps secured to said body at spaced points, the legs of each clamp engaging said spaced surfaces, and the leg engaging said one surface having an extending portion, the extremity of which is reduced to form a shoulder and a tongue, and the bight of each clamp overlies the periphery of said body and is formed with an abutment; each of said tongues passing through the respective one of said member recesses, and being bent to overlie one side of said member, the other side of said member being clamped against said shoulders; and an adapter member, having a resiliently-distortable wall generally circumscribing the periphery of said body, said wall having recesses spaced to correspond to the spacing of the abutments of said clamps, and the marginal surfaces of said wall recesses receiving said clamp abutments in latching relation, the resiliency of said wall yieldably holding said abutments and the marginal surfaces of said wall recesses in such latching relation.

3. A heating device, comprising: a body, carrying heating means, and having spaced surfaces; a heat directing member, overlying one of said surfaces; means supporting said member in position overlying said one surface, comprising a plurality of clamps secured to said body at spaced points, each clamp comprising a portion embracing a peripheral part of said body and a portion connected to said member; and an adapter, for supporting said device; said adapter and each of said clamps comprising a snap-connection detachably connecting said clamp to said adapter.

4. A heating device, comprising: a body, carrying heating means, and having spaced surfaces; a heat directing member, overlying one of said surfaces; means supporting said member in position overlying said one surface, comprising a plurality of clamps secured to said body at spaced points, each clamp comprising a portion embracing a peripheral part of said body and a portion connected to said member, each of said embracing portions having a wedge-shaped abutment extending beyond the periphery of said body; an adapter member, having a resiliently-distortable wall generally circumscribing the periphery of said body, said wall having apertures adapted to receive corresponding wedge-shaped abutments; said adapter member being assembled with said body by pressing said wall over the incline of said wedge-shaped abutments, said abutments distorting said wall until said abutments snap into corresponding apertures, the resiliency of said wall yieldably holding said adapter member against disassembly from said body.

5. A heating device, comprising: a body, carrying heating means, and having spaced surfaces; a heat directing member, overlying one of said surfaces, and having spaced-apart apertures; and a plurality of spaced-apart clamp means, each having spaced portions engaging said body inwardly of the peripheral edge of said body and a part overlying said peripheral edge and joining said spaced portions; and each of said clamp means having a portion extending away from said one surface, the extremity of said extending portion being reduced, providing a shoulder and tongue; said tongues passing through respective apertures in said heat directing member, and being bent to overlie one side of said directing member, and said shoulders engaging the opposite side of said member.

6. A heating device, comprising: a body, carrying heating means, and having spaced surfaces; a heat directing member, overlying one of said surfaces; and a plurality of spaced-apart clamp means, each having spaced portions engaging said body inwardly of the peripheral edge of said body and a part overlying said peripheral edge and joining said spaced portions; and each of said clamp means having a connection with said heat directing member, holding said member in overlying position with respect to said one surface, and holding also said clamp means against disassembly from said body.

7. A heating device, comprising: a body, carrying heating means, and having spaced surfaces; a heat directing member, overlying one of said surfaces, and having a plurality of spaced-apart apertures; and a plurality of clamp means, spaced-apart to correspond to the spacing of the apertures in said heat directing member, each clamp means having spaced portions engaging said body inwardly of the peripheral edge of said body and a part overlying said peripheral edge and joining said spaced portions; and each of said clamp means having also an extending portion extending through a corresponding aperture in said directing member and formed to hold said directing member in position overlying said one surface, said extending portions abutting the marginal surface of corresponding apertures, holding said clamp means against disassembly from said body.

EDWIN L. WIEGAND.
ERNEST N. CALHOUN.